United States Patent [19]

Nishizawa

[11] Patent Number: 5,745,154
[45] Date of Patent: Apr. 28, 1998

[54] DIGITAL IMAGE FORMING APPARATUS WITH SCAN SYNCHRONIZATION

[75] Inventor: Katsuhiko Nishizawa, Kanagawa, Japan

[73] Assignee: Fuji Xerox Co., Ltd., Tokyo, Japan

[21] Appl. No.: 587,034

[22] Filed: Jan. 16, 1996

[30] Foreign Application Priority Data

Jan. 13, 1995 [JP] Japan ................................ 7-019860

[51] Int. Cl.$^6$ ........................................................ B41J 2/47
[52] U.S. Cl. ........................................... 347/250; 347/235
[58] Field of Search ............................. 347/235, 246,
347/247, 236, 237, 250; 358/296, 298,
300, 302; 395/111

[56] References Cited

U.S. PATENT DOCUMENTS 4,710,779 12/1987 Funaki et al. ........................ 347/247
5,305,023 4/1994 Fukushige et al. ................... 347/235

*Primary Examiner*—Mark J. Reinhart
*Attorney, Agent, or Firm*—Finnegan, Henderson, Farabow, Garrett & Dunner, L.L.P.

[57] ABSTRACT

A digital image forming apparatus is constructed to accurately detect period abnormality of a horizontal sync signal. In the apparatus, a sync signal generation portion outputs the horizontal sync signal by a received light signal from a light position detector. A sync signal abnormality monitor monitors whether a detected period of the sync signal is longer than a reference period, or it is normal. When the output signal of the sync signal is judged to be longer than the reference period, an abnormality detecting signal is supplied to a continuous turning-on portion. When the continuous turning-on portion receives the abnormality detecting signal, it issues an instruction to a synchronizing turning-on portion so that video data continues to be turned on, that is, turning-on signal is continuously outputted. Since a laser beam is continuously turned on by this instruction, the light position detector can certainly receive the laser beam. Accordingly, the period of the sync signal can be accurately detected and the cause of period abnormality can be specified.

4 Claims, 7 Drawing Sheets

DIGITAL IMAGE FORMING APPARATUS WITH SCAN SYNCHRONIZATION

BACKGROUND OF THE INVENTION

The present invention relates to a digital image forming apparatus, and more particularly to a digital image forming apparatus of the type in which an electrostatic latent image is formed on a photoreceptor by scanning the photoreceptor with a laser beam which is turned on based on video data.

In a known xerography-basis image forming process of a laser beam printer, a copying machine or the like, first, a photoreceptor is uniformly charged. The charged surface of the photoreceptor is exposed to a laser beam containing image data, to thereby form an electrostatic latent image on the photoreceptor. The electrostatic latent image is developed with toner into a visual image or a toner image. The toner image is transferred and fixed on a paper to form a digital image. Generally, a laser diode is used for a light source of an exposure unit. A laser beam emitted from the light source is modulated by video data, and deflected by a rotary mirror with a multiple of facets. Further, the beam diameter of the laser beam or the like is corrected by an optical system. Then, the laser beam is imaged on the photoreceptor. In the exposure unit, a photo sensing device is located in the deflection scan path of the laser beam, to thereby sense a laser beam. The photo sensing device is provided to time the image writing operation. The horizontal synchronization is achieved by sensing the laser beam passing through the photo sensing device.

The laser beam is continuously turned on at the initial state. After the laser beam is sensed by the photo sensing device, the laser beam is turned on/off to form images in accordance with the timing generated on the basis of the time of sensing, or the laser beam is turned on for a predetermined time to obtain the horizontal synchronizing signal (hereinafter referred to as simply "sync signal").

Accordingly, if the photo sensing device, which is provided to obtain the sync signal, goes wrong and fails to detect the laser beam, the laser beam, which was first turned on, can not be turned off so that the laser beam will be continuously radiated to the photoreceptor. As a result, there arises a disadvantage that only the portion continuously irradiated by the laser beam is concentrically degraded.

A printing apparatus to cope with this problem is disclosed in Japanese Patent Unexamined Publication No. Sho. 51-93219. In this apparatus, when the photo sensing device, which is for providing a sync signal, produces no signal within a preset period of time, the printing apparatus decides that the scanning operation is abnormal. In connection with this, an exposure device is proposed in Japanese Patent Unexamined Publication No. Hei. 2-60766. In this device, a period of time in which the laser beam is continuously outputted irrespective of video data, that is, a time period to forcibly emitting light is preset in the exposure unit. When no photo sensing signal is produced within this time period, the exposure device decides that abnormality arises. Further, an information output device disclosed in Japanese Patent Unexamined Publication No. Sho. 62-209473 decides that the scanning operation is abnormal when no photo sensing signal is produced within a tolerable time period.

Although each of the conventional devices can detect that abnormality arises, it frequently fails to exactly specify the actual contents of the abnormal scanning operation so that it may make a mistaken decision on the state of the scanning operation. For example, when a motor speed of a drive motor (referred to as a "scanner motor"), which drives the rotary mirror with a multiple of facets for the scan of the laser beam, is high, or when the photo sensing device unexpectedly receives light by affection of stray light, i.e., reflection light, the light sensing element produces a light sensing signal earlier than a preset reference period. Thus, in this case, the device should detect such abnormality that the period of the sync sinal is short.

However, time duration of turning-on a laser diode is preset to be extremely short for a region other than an image forming region. This is made to minimize the deterioration of the photoreceptor. Therefore, if the rotation speed of the scanner motor becomes high, since the timing of turning on the laser diode is put off, it may happen that the light sensing element can not detect the laser beam, Then, there is a problem that although the rotation speed of the scanner motor is actually high so that the period of the sync signal is short, the device mistakenly decides that the period of the sync signal is long so that the rotation speed of the scanner motor is low.

This problem will be described in more detail with reference to FIG. 8. In the timing chart of FIG. 8, a laser diode is turned on at period T for preset time duration t by a turning-on signal v, in order to horizontally synchronizing the scanning operation. All parameters of times for turning on the laser beam are set on the basis of the sync signal SOS. That is, the turning-on time duration t in which the laser diode is turned on, is defined by time duration t1 from the sync signal SOS to start of turning on, time duration t2 from detection of the sync signal SOS to end of turning on, and reference period T as (t=T+t2−t1). Further, in addition that the laser diode in turned on to detect the sync signal SOS and to make the horizontal synchronization, it is turned on in region A provided to form images based on video data.

The period T is determined by the relationship between the number of rotations of the scanner motor and the position of the light sensing element so that the laser beam radiates the light sensing element for producing the sync signal. In a normal state, the light sensing element receives the laser beam at the period T to output the sync signal SOS. However, when the rotation speed of the scanner motor is high, the scanning position reaches the position of the light sensing element at period Ts shorter than the preset period T. Therefore, the laser beam of the laser diode, which is turned on at period T for time duration t, does not radiate the light sensing element and hence no sync signal SOS is produced.

If time duration t is made long, that is, if time duration t1 is made short and time duration t2 is made long, the above problem is solved to some extent. However, the affection of stray light becomes high. Further, it is contradictory to such a desire as to reduce the turning-on time duration t as short as possible in order to prevent the photoreceptor being deteriorated or to elongate the lifetime of the laser diode.

SUMMARY OF THE INVENTION

The present has been made in view of the above circumstances and has an object to provide a digital image forming apparatus by which the above problems are overcome and abnormality of horizontal synchronization can be certainly detected.

In order to solve the above problems and achieve the object, according to a first aspect of the present invention, a digital image forming apparatus comprises deflection means for scanning with a laser beam emitted from a laser beam source, synchronizing turning-on means for turning on the laser beam source for preset time duration in the outside of an image writing region in accordance with a reference period, light sensing means disposed outside the image writing region and for sensing the laser beam emitted from the laser light source and producing a sync signal, abnormality detecting means for detecting abnormality by comparing a period of the sync signal produced by the light sensing means with the reference period, continuous turning-on means for continuously turning on the laser beam source when the abnormality detecting means judges that the period of the sync signal is longer than the reference period, and abnormality specifying means for specifying the contents of abnormality according to whether or not the period of the sync signal outputted from the light sensing means during an operation of continuously turning on the laser beam source is shorter than the reference period.

According to this first aspect, when it is judged that the period of the sync signal is longer than the reference period, the detecting operation of the laser beam is conducted in a state in which the laser beam is continuously turned on. Accordingly, the abnormality specifying means can specify which trouble of the light sensing means, the deflection means or the like caused that the laser beam was not detected at the reference period.

Also, according to a second aspect of the present invention, the abnormality detecting means is constructed such that when the period of the sync signal is judged to be shorter than the reference period, it outputs abnormality specifying information indicating that the rotation speed of the deflection means is high. According to this second aspect, it is possible to specify such contents of abnormality that the rotation speed of the deflection means is too high for the light sensing means to detect the laser beam at the reference period so that the period of the sync signal is judged to be long.

Also, according to a third aspect of the present invention, the abnormality specifying means is constructed such that when the period of the sync signal is judged to be longer than the reference signal, it outputs abnormality specifying information indicating that the rotation speed of the deflection means is low. According to this third aspect, it is possible to specify such contents of abnormality that the rotation speed of the deflection means is too low for the light sensing means to detect the laser beam at the reference period so that the period of the sync signal is judged to be long.

Also, according to a fourth aspect of the present invention, the abnormality specifying means is constructed such that when the light sensing means does not detect the laser beam during an operation of continuously turning on the laser beam source by the continuous turning-on means, it outputs abnormality specifying information indicating that there is abnormality other than the rotation speed of the deflection means. According to this fourth aspect, it is possible to specify such contents of abnormality that the period of the sync signal is judged to be long by a trouble other than the deflection means.

BRIEF DESCRIPTION OF THE DRAWING(S)

DETAILED DESCRIPTION OF THE PREFERRED EMBODIMENTS

The preferred embodiments of the present invention will be described with reference to the accompanying drawings.

Figure 2:
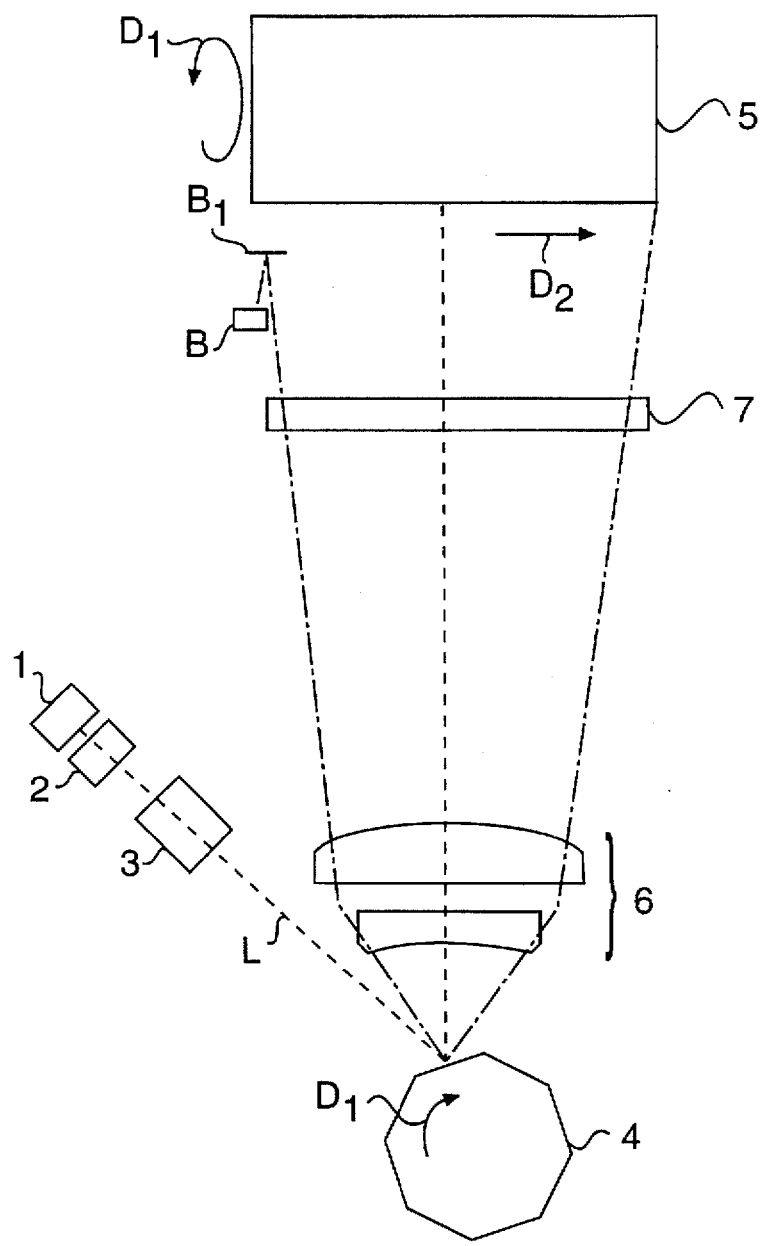
FIG. 2 is a plan view showing a main hardware construction of the digital image forming apparatus according to the embodiment of the present invention.

FIG. 2 is a plan view showing a main hardware construction of a digital image forming apparatus according to an embodiment of the present invention. In the figure, a laser diode 1 is used as a laser beam source. A laser beam L is emitted from the laser diode 1, and reaches a rotary mirror 4 with a multiple of facets, through a collimator lens 2 and a cylinder lens 3. The rotary mirror 4 has an eight number of reflection surfaces, and is driven by a drive source (not shown) such as a motor to turn in the direction of an arrow D1. As a result, the laser beam L, when reaching the reflection surface, viz., the facet of the rotary mirror 4, is moved in the direction of an arrow D2, viz., the main scan direction, for scanning the surface of a medium to be scanned, i.e., a photoreceptor 5. In the present embodiment, as the medium to be scanned, that is, as an image carrying member, the photoreceptor 5 of a drum shape is scanned by the laser beam, but it may take the form of a flat member.

To move the laser beam L across the photoreceptor 5 at a constant speed, a f-θ lens 6 and a cylinder mirror 7 are located between the rotary mirror 4 and the photoreceptor 5. A light-position detector 8, which is composed of a photo-electric conversion element such as a photo diode, detects a laser beam reflected by a mirror 8a to produce a detecting signal which is necessary to horizontally synchronize a laser beam generating position with a modulating signal, that is, a sync signal SOS.

The drum-shaped photoreceptor 5 is rotatably supported by a frame (not shown) of the image forming apparatus, and is rotated in the direction of an arrow D3 by a drive source (not shown) such as a motor. A charger for uniformly charging the surface of the photoreceptor 5, a developing unit, a transfer unit, and the like are disposed around the photoreceptor 5. Those are not essential to the present invention, and hence are not illustrated.

Figure 3:
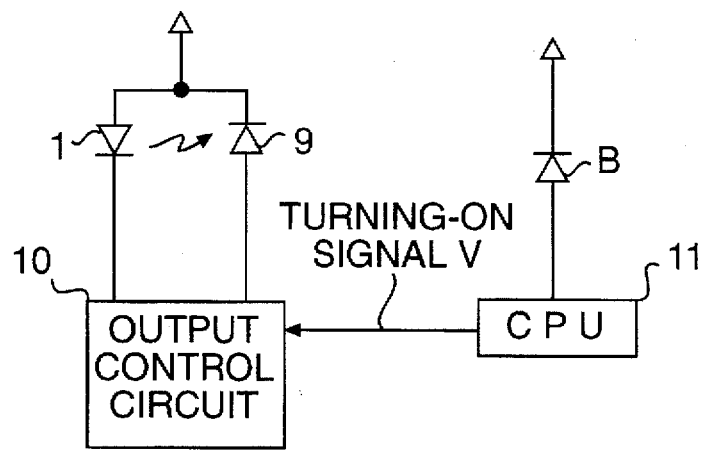
FIG. 3 is a block diagram schematically showing the structure of a control device of the image forming apparatus according to the embodiment of the present invention.
Figure 8:
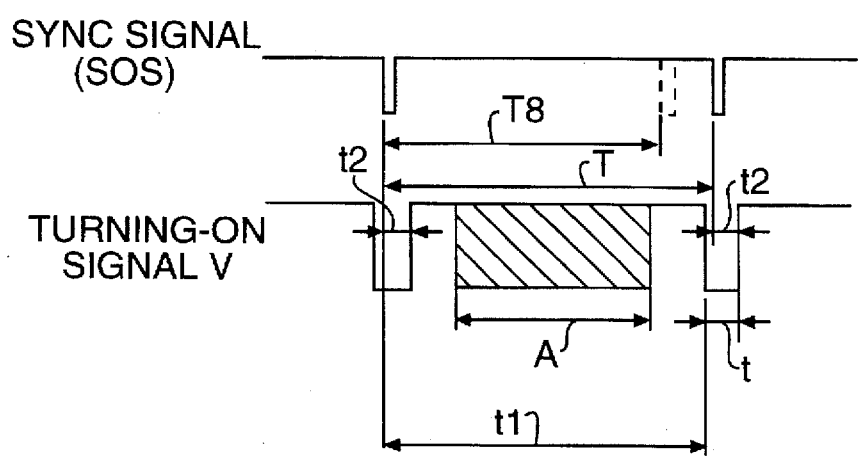
FIG. 8 is a timing chart showing the relation between a sync signal and a turning-on signal according to a conventional apparatus.

A control device in the digital image forming apparatus will next be described. FIG. 3 is a block diagram showing the structure of the output control device for the laser diode 1. As shown, a photo diode 9 for sensing the quantity of light emitted from the laser diode 1 is provided adjacent to the laser diode 1. The anode of the laser diode 1 and the cathode of the photo diode 9 are connected to a power source, and the cathode of the laser diode 1 and the anode of the photo diode 9 are connected to an output control circuit 10. The output control circuit 10 compares an output signal of the photo diode 9 with a set value of the light quantity, and controls a current flowing into the laser diode 1 in accordance with the result of the comparison. The laser diode 1 is turned on depending on turning-on signal v supplied to the output control circuit 10. The turning-on signal v is supplied in the operation region A of the image region (see FIG. 8) in accordance with video data, and is further supplied outside the image region for a short time to obtain the sync signal.

A CPU 11 receives the sync signal, which is a detection signal derived from the light-position detector 8, determines the time of outputting the turning-on signal, checks synchronization abnormality of the sync signal, and if the sync signal is abnormal, takes a measure for the abnormality.

Figure 4:
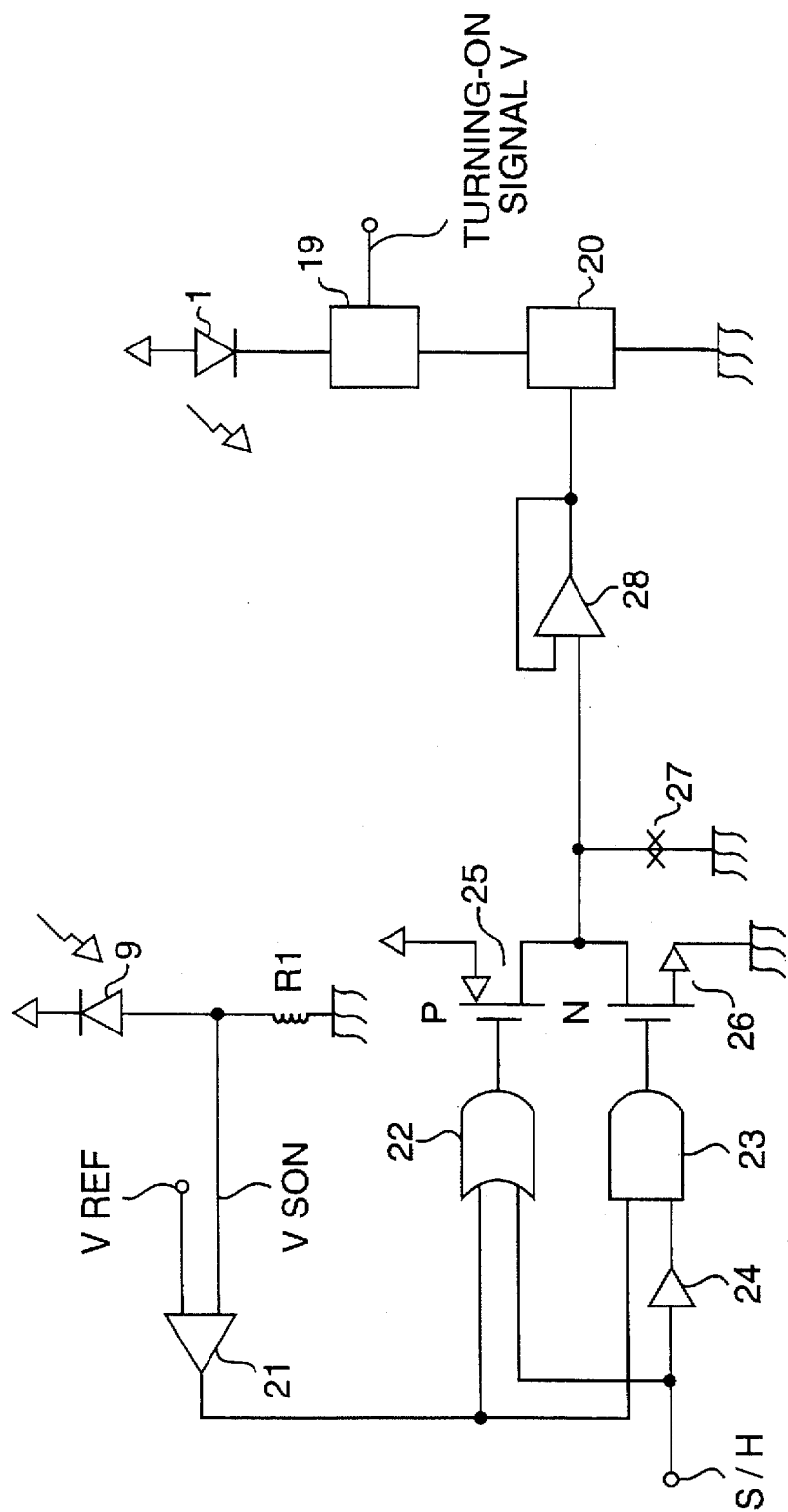
FIG. 4 is a circuit diagram of an output control device according to the embodiment of the present invention.

An example of the arrangement of the output control circuit 10 will next be described with reference to FIG. 4. In the figure, a switching circuit 19 is turned on and off in accordance with the turning-on signal. For example, the switching circuit 19 is turned off when receiving a high level signal "H", and turned on when receiving a low level signal "L". Thus, the turning-on signal v changes to "H" or "L" at a high speed in accordance with video data, and changes to "L" at the timing of obtaining the sync signal. The laser diode 1 is driven by a current, which flows into the diode when the switching circuit 19 is turned on. The amplitude of the current flowing into the laser diode 1 is set by a drive current control circuit 20.

In order to control the current flowing into the laser diode 1 to be constant, the present embodiment employs a circuit arrangement to be given below. The photo diode 9 receives the back beam of the laser beam outputted from the laser diode 1. As a result, a current proportional to the quantity of the laser beam flows through the photo diode 9. A resistor R1 is inserted between the photo diode 9 and the ground. A connection point between the photo diode 9 and the resistor R1 is connected to the positive input terminal of a comparator 21. With this circuit connection, a current flowing into the photo diode 9 is converted into a voltage signal, and is inputted in the form of a voltage signal to the comparator 21. The voltage signal is hereinafter referred to as a monitor voltage Vmon. A light-quantity set signal Vref, which provides a reference value for producing a desired quantity of light, is applied to the negative input terminal of the comparator 21.

The output signal of the comparator 21 is inputted to first input terminals of an OR gate 22 and an AND gate 23. A sample/hold signal S/H is applied to a second input terminal of the OR gate 22. The sample/hold signal S/H is inverted and the inverted one is inputted to a second input terminal of the AND gate 23. The output signal of the OR gate 22 is inputted to a P-channel CMOS switch (hereinafter referred to as a "P switch") 25. The output signal of the AND gate 23 is applied to an N channel CMOS switch (hereinafter referred to as an "N switch") 26. The drains of the P switch 25 and the N switch 26 are connected to a hold capacitor 27 and an operational amplifier 28. The output terminal of the operational amplifier 28 is connected to the drive current control circuit 20.

With the above structure, when the monitor voltage Vmon is smaller than the light-quantity set signal Vref, and when the sample/hold signal S/H is "L", viz., in a sample mode, the P switch 25 is conductive, but the N switch 26 is nonconductive. Accordingly, a hold voltage across the hold capacitor 27 increases, a voltage applied to the drive current control circuit 20 also increases, and the quantity of light emitted from the laser diode 1 increases. When the quantity of light from the laser diode 1 increases so that the photo diode 9 receives the increased quantity of light, the monitor voltage Vmon increases, and when it reaches the light-quantity set signal Vref, the output signal of the comparator 21 is inverted in logic level to be "H". When the output signal of the comparator 21 is inverted, if the sample/hold signal S/H is "L" in logic level, the N switch 26 is conductive, while the P switch 25 is nonconductive. As a result, the hold voltage across the hold capacitor 27 drops, the voltage supplied to the drive current control circuit 20 drops, and the quantity of light of the laser diode 1 decreases.

As described above, the light quantity control circuit functions to control the current of the photo diode 9, viz., a quantity of received light, to be constant. At a preset timing outside the image region before the printing operation starts, the sample/hold signal S/H and the video signal are both set to an "L" logic level and the above control is conducted, so that the laser diode 1 is controlled to output a laser beam of a reference light quantity. In a print mode, the sample/hold signal S/H is set to an "H", viz., a hold mode is set up. Then, the voltage held by the hold capacitor 27 causes the laser diode 1 to emit a laser beam of a desired quantity of light in accordance with on/off of video data. As a result, an image with a uniform density is formed on the photoreceptor (not shown).

The thus set quantity of light varies depending on the heat generated by the operating laser diode 1 and a leak of the hold voltage across the hold capacitor 27. Thus, the above-mentioned light quantity control is performed in a preset region out of the image region at any time, whereby the light quantity of the laser beam emitted from the laser diode 1 is controlled to be constant, and hence the required quantity of the printed image is kept.

Figure 1:
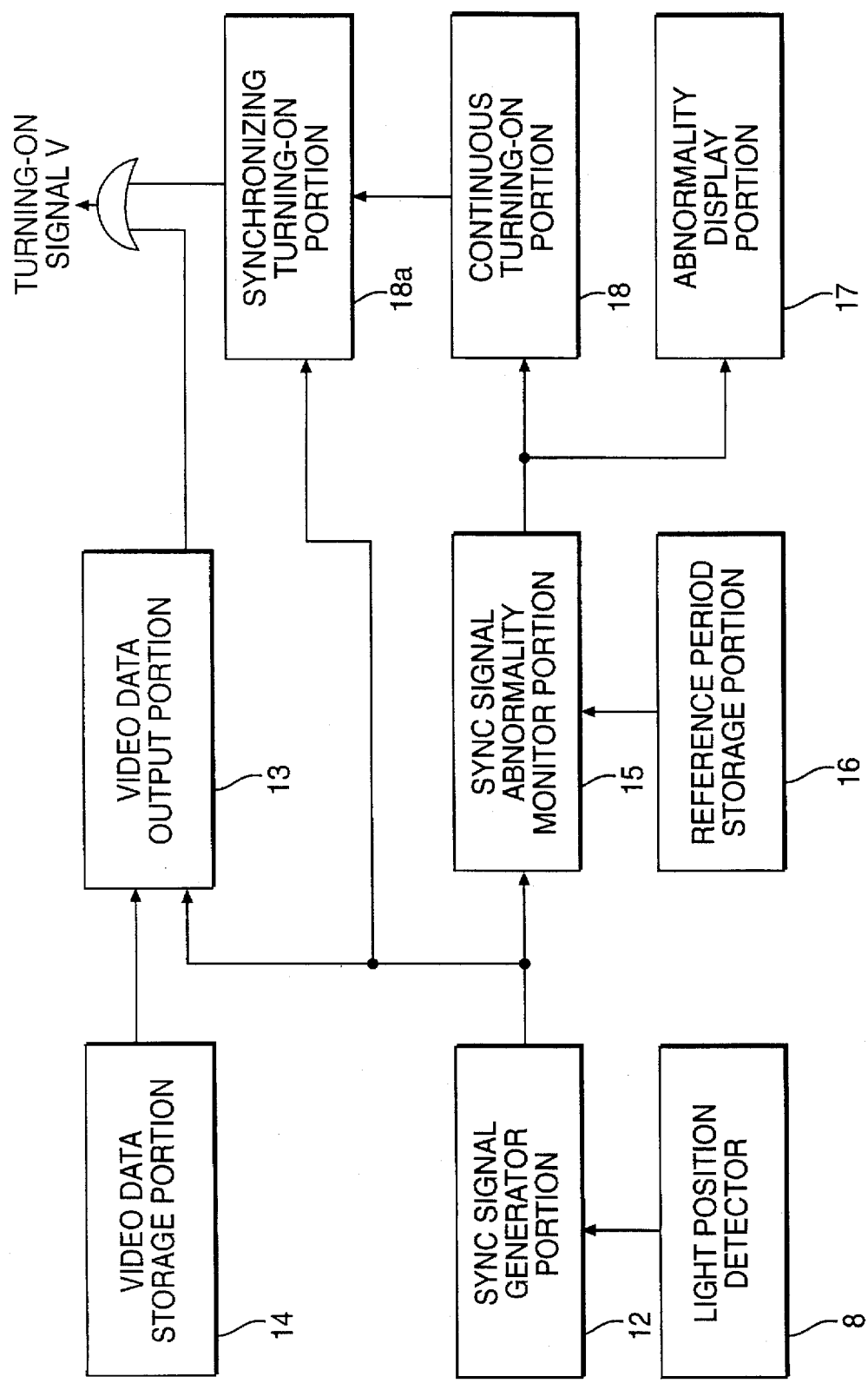
FIG. 1 is a functional block diagram showing major functions of a CPU incorporated into a digital image forming apparatus according to an embodiment of the present invention.

The function of the CPU 11 will be described. FIG. 1 is a functional block diagram showing major functions of the CPU 11. In the figure, the light-position detector 8 outputs a detection signal to a sync signal generator portion 12 when the level of receiving light is higher than a preset value. The sync signal generator portion 12 produces a sync signal SOS when the detection signal is supplied from the light-position detector 8. The sync signal SOS is applied to a video data output portion 13. Video data are stored in a video data storage portion 14. When the digital image forming apparatus is a printer section of a copying machine, the stored video data corresponds to the image information previously read out of an original document. When it is a printer section of a facsimile, the stored video data corresponds to the received image information. The video data output portion 13 reads video data out of the video data storage portion 14 at the readout timing determined on the basis of the sync signal SOS, and outputs the turning-on signal v to the output control circuit 10 in accordance with the video data.

The sync signal SOS is applied to a sync signal abnormality monitor portion 15. The sync signal abnormality monitor portion 15 checks whether or not the period of outputting the sync signal SOS is normal. An abnormality display portion 17 displays errors when the sync signal abnormality monitor portion 15 detects abnormality. The display portion is constructed by, for example, a liquid crystal display device.

The judgement whether the period is a normal value or not, is made by comparing the output period of the sync signal SOS with the reference period stored in a reference period storage portion 16. If the outputting period of the sync signal SOS is more apart from a preset insensitive zone than the reference period, the sync signal monitor portion 15 sends a signal indicative of abnormality to the abnormality display portion 17. In response to this, the abnormality display portion 17 displays a message of the abnormality. The abnormality display portion 17 is not necessarily a display device to be capable of displaying characters. It may be a lamp indicating a function previously specified, or may be a notification device by an alarm sound. That is, it may be anything as long as it can notify an operator or a maintenance manager of the information indicating the specified abnormality.

Further, the sync signal SOS is also supplied to a synchronizing turning-on portion 1a. The synchronizing turning-on portion 18a turns on or off the turning-on signal v at preset timing. If it is judged that the period of the sync signal SOS is longer than the reference period, the abnormal signal is applied also to a continuous turning-on portion 18. In response to the abnormal signal, the continuous turning-on portion 18 produces an instruction signal to the synchronizing turning-on portion 18a so that the on-state of the video data continues, that is, the turning-on signal v is continuously outputted.

Figure 5:
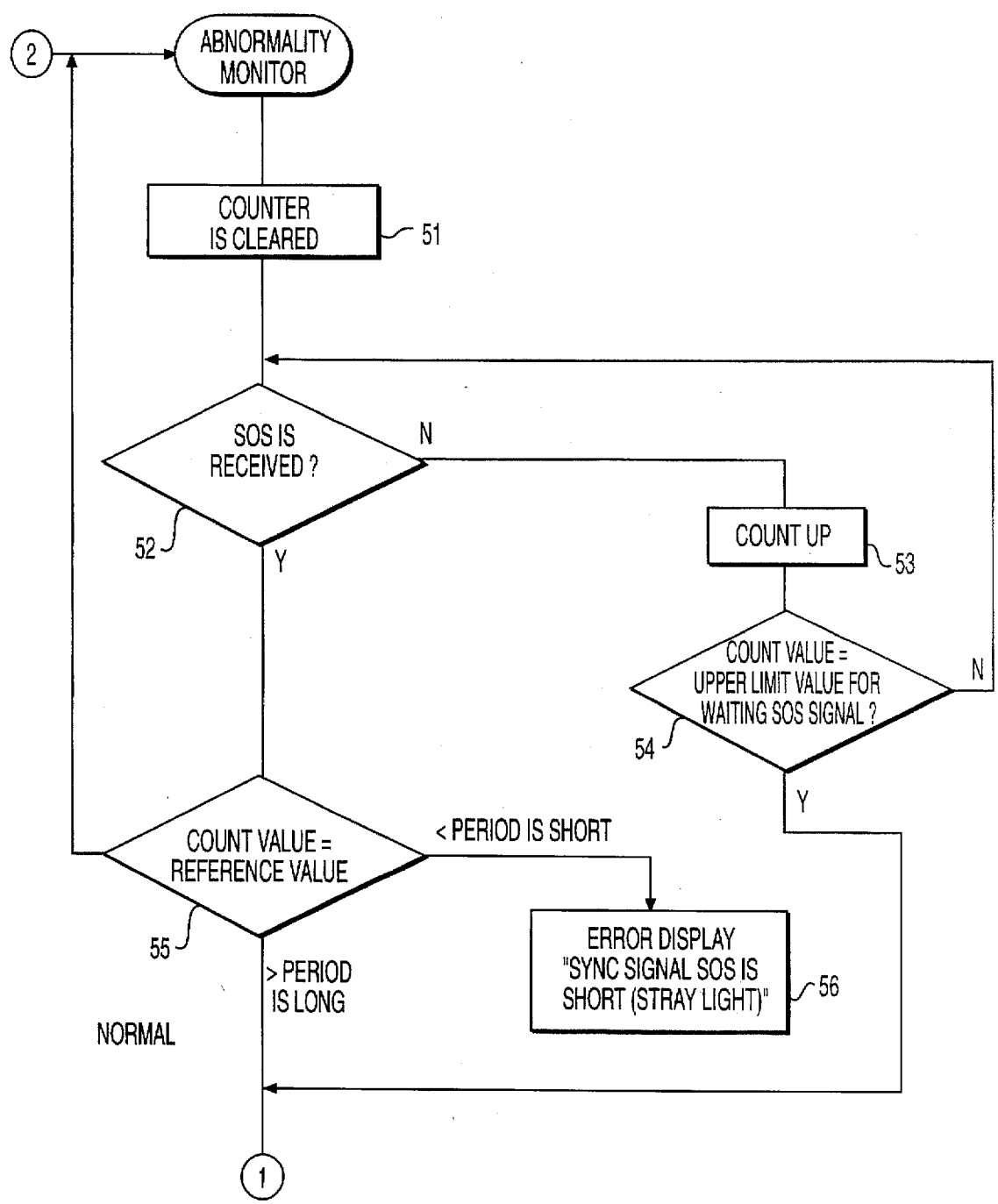
FIG. 5 is a flowchart (No. 1) showing an operation of monitoring the abnormality.
Figure 6:
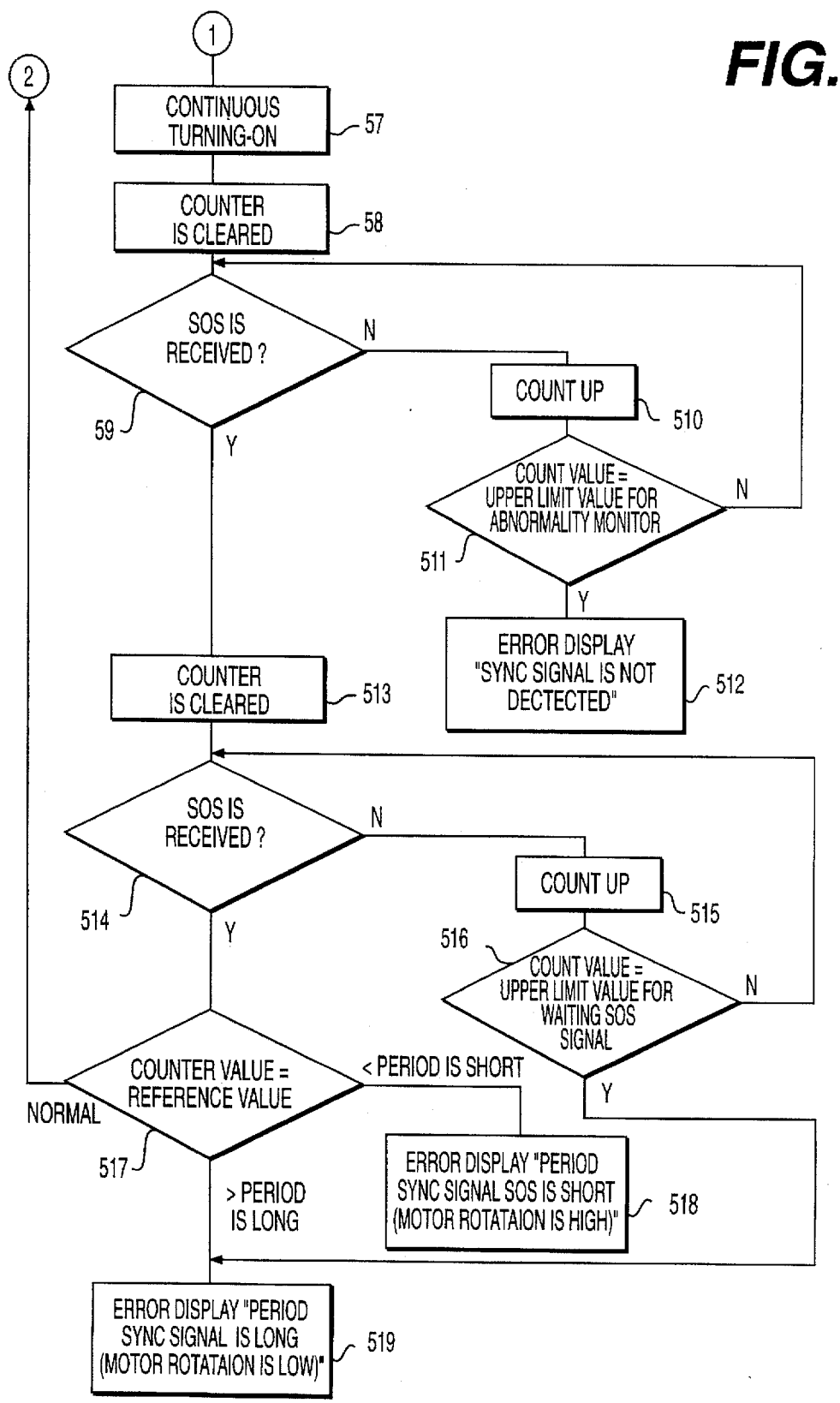
FIG. 6 is a flowchart (No. 2) showing an operation of monitoring the abnormality.

The abnormality monitoring operation of the sync signal monitor portion 15 will be described with reference to flowcharts shown in FIGS. 5 and 6. In FIG. 5, in step S1, a counter is cleared. The counter counts a detected period of the sync signal SOS. In step S2, it is judged whether the sync signal SOS is received. When the sync signal SOS is not received, step S3 is performed so that the increment (+1) of the counter is conducted. In step S4, it is judged whether the value of the counter reaches the upper limit value (TLMT described later) for waiting the sync signal SOS. Until the value of the counter reaches the upper limit value, the process of step S2 is repeated. When the sync signal SOS is received, step S5 is conducted.

In step S5, the value of the counter is compared with a value (reference value) corresponding to the reference period. If the value of the counter is not out of the reference value, it is judged that an operation is normal and the process is returned to step S1. When the value of the counter is smaller than the reference value, it is judged that the period of the sync signal SOS is shorter than the reference period, and step S6 is conducted to display errors. The contents of error display is "Period of sync signal SOS is short". The judgement that the sync signal SOS is shorter than the reference period is due to stray light and the contents of error display is "Period of sync signal SOS is short (stray light)".

When the value of the counter is larger than the reference value, it is judged that the period of the sync signal SOS is longer than the reference period and step S7 (FIG. 6) is conducted to continuously outputting the turning-on signal v.

When the judgement in step S4 is yes, that is, when the sync signal SOS is not received even when the value of the counter reaches the upper limit value (TLMT) for waiting the sync signal SOS, steps S5 and S6 are skipped and step S7 (FIG. 6) is conducted. In step S7, the turning-on signal v is continuously outputted.

The turning-on signal v is continuously outputted in step S7 in order to certainly detect the sync signal SOS by continuously turning on the laser beam. That is, when the sync signal SOS is detected, the laser beam is turned off after a preset time (after time period t2) from the time of detection. In this embodiment, after the laser beam is once turned off, it is again turned on so that the sync signal SOS can be detected at any time. When the state in which the sync signal SOS is certainly detected, is achieved, it is possible to accurately understand the cause why it is judged that the period of the sync signal SOS is long or the sync signal SOS is not detected.

Thus, steps S9 to S19 are processes to specify abnormality. In a front stage of these processes, that is, in steps S7 to S12, the initial sync signal SOS as reference for abnormality specifying operation is detected. In step S8, the counter is cleared. In step S9, it is judged whether or not the sync signal SOS is received. When the sync signal SOS is not detected, step S10 is conducted to make increment of the value of the counter. In step S11, it is judged whether the value of the counter reaches the upper limit value for abnormality monitor. Until the value of the counter reaches the upper limit valuer step S9 is repeated. When the sync signal SOS is not received even when the value of the counter reaches the upper limit value, step S12 is conducted. In step S12, error display is performed. The contents of the error display are "Sync signal SOS is not detected". In this case, since it is considered that the light position detector 8 is out of order or light path is put off, such display as to give an instruction for checking those possibility may be performed at the same time as the error display. When the sync signal SOS is received until the value of the counter reaches the upper limit value, step S13 is conducted.

In step S13, the counter is cleared. In steps S14 to S17, the period of the sync signal SOS is newly judged. Since steps S13 to S16 are similar to steps S2 to S4, the description will be omitted. In step S17, judgement as in step S5 is conducted. However, in step S17, since the laser beam is continuously turned on, the value of the counter put off the reference value is also an object to be judged.

In step S17, when it is judged that the value of the counter is smaller than the reference value, step S18 is conducted to perform error display. In this case, it is judged that since the rotation of the rotation mirror 4 is high, the value of the counter smaller than the reference value is detected. The error display is "Period of sync signal SOS is short (motor rotation is high)".

In step S17, when it is judged that the value of the counter is larger than the reference value, step S19 is conducted to make error display. Here, it is judged that since the rotation of the rotation mirror 4 is small, the value of the counter larger than the reference value is detected. The error display is "Period of sync signal SOS is long (motor rotation is low)". Further, in step S17, if it is judged that the sync signal is normally detected, the process is returned to step S1.

Figure 7:
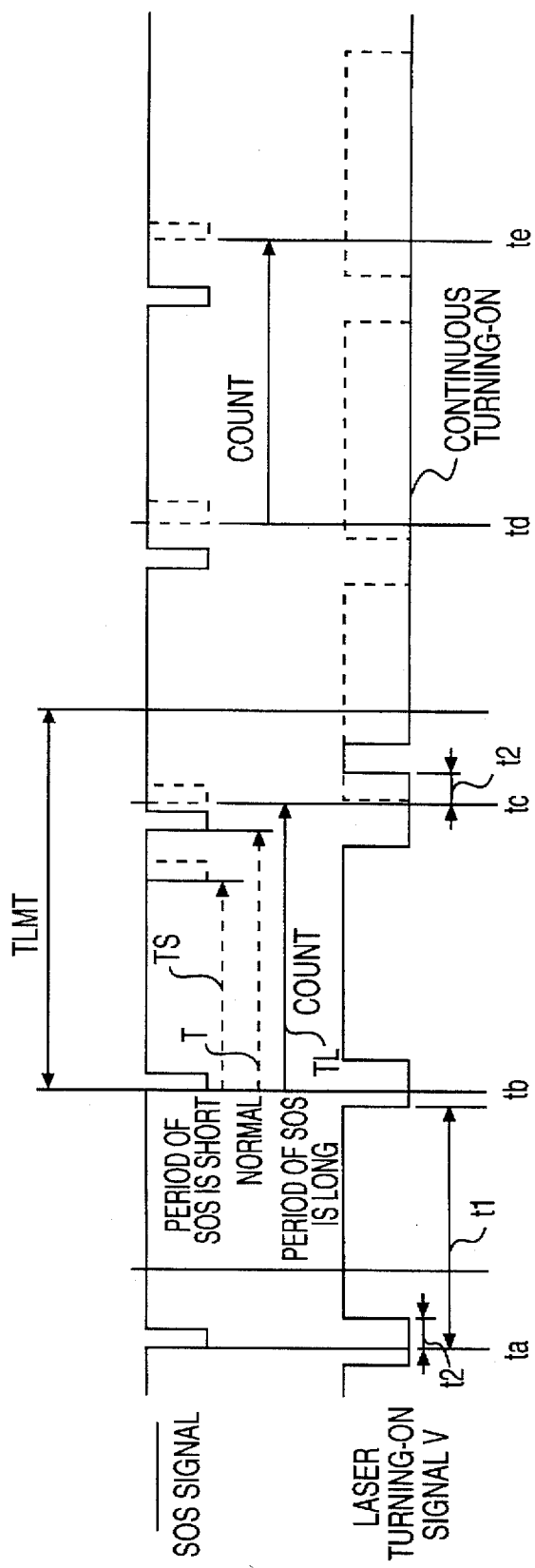
FIG. 7 is a timing chart showing the relation between a sync signal and a turning-on signal according to the embodiment of the present invention.

FIG. 7 is a timing chart showing the above timing. In this figure, an upper stage shows timing of the sync signal SOS, and a lower stage shows timing of the turning-on signal v. As shown in FIG. 7, with reference to the sync signal SOS, the turning-on signal v is turned on after time duration t1, and the turning-on signal v is turned off after the time duration t2.

When the abnormality monitoring signal is outputted at timing ta so that the process shown in FIG. 5 starts, the counter is cleared by detection timing tb of the sync signal SOS immediately thereafter to count a period of the sync signal SOS. When the period of the sync signal SOS is a normal value T, the sync signal SOS is detected while the turning-on signal v is turned on. However, when abnormality arises so that the period becomes short and it becomes TS, since the turning-on signal is not turned on, the sync signal is not detected. As a result, it is erroneously judged that the period of the sync signal SOS is long. At a normal time, since the laser beam is turned off after a preset time, that is, time duration t2 from the detection of the sync signal SOS. However, when the period of the sync signal is long, the sync signal SOS is not detected and the laser beam is not turned off. Thus, when the period is long, the sync signal SOS is detected at timing later than the preset timing when the sync signal SOS is normal. That is, the period of the sync signal SOS becomes TL longer than the reference period T and it is judged that the period is long.

As described above, in this embodiment, when the period is actually long, or when it is erroneously judged that the period is long since the period is extremely short, after the sync signal SOS is detected, the laser beam is once turned off, and then it is again turned on and it is continuously turned on to specify abnormality. FIG. 7 shows a state in which when the period TL is detected, the turning-on signal v is continuously turned on at timing tc. This corresponds to the process in the case where it is judged that the period of the sync signal SOS is long in step S10 (FIG. 5). The dotted line of the turning-on signal v indicates timing of true turning-on signal v.

At timing td, in the state of continuously turning on the laser beam, the counter is cleared to newly detect the period. The contents of abnormality are judged by the sync signal SOS detected after timing td. In FIG. 7, the sync signal SOS is detected at timing te.

When the sync signal SOS is not received untill the upper limit for waiting the sync signal since the period of the sync signal is short, after a time duration corresponding to the upper limit value, that is, after time period of TLMT in the figure, the laser beam is continuously turned on.

As described above, in this embodiment, when it is judged that the period of the sync signal SOS is long, the period of the sync signal is judged in the state in which the laser beam is certainly received by continuously turning on the laser diode 1. Accordingly, the abnormal state is accurately grasped, and further the cause of the abnormality can be specified.

As seen from the foregoing description, according to the first aspect of the present invention, when period abnormality of the sync signal, especially abnormality that the period is longer than the reference period, is detected, the detecting means for the sync signal output can certainly detect the laser beam. Accordingly, based on the result of the received light, the contents of the abnormality can be detected more accurately.

Further, according to the second to fourth aspects of the present invention, it is possible to specify the cause of abnormality and output the result. As a result, since it is possible to accurately understand the cause of the malfunction, it is possible to practice an operation such as repair or adjustment accurately and efficiently.

What is claimed is:

1. A digital image forming apparatus, comprising
a laser beam source;
deflection means for making a laser beam scan, said laser beam being emitted from said laser beam source;
synchronizing turning-on means for turning on said laser beam source in an outside of an image writing region for preset time duration in accordance with a reference period;
light sensing means disposed outside said image writing region and for sensing said laser beam emitted from said laser beam source to produce a sync signal;
abnormality detecting means for detecting abnormality by comparing a period of said sync signal produced by said light sensing means with said reference period;
continuous turning-on means for continuously turning on said laser beam source when said abnormality detecting means judges that said period of said sync signal is longer than said reference period; and
abnormality specifying means for specifying contents of abnormality according to whether or not the period of said sync signal produced from said light sensing means during an operation of continuously turning on said laser beam source is shorter than said reference period.

2. A digital image forming apparatus as claimed in claim 1, wherein said abnormality specifying means produces abnormality specifying information indicating that a rotation speed of said deflection means is high when the period of said sync signal is judged to be shorter than said reference period.

3. A digital image forming apparatus as claimed in claim 1, wherein said abnormality specifying means produces abnormality specifying information indicating that a rotation speed of said deflection means is low when the period of said sync signal is judged to be longer than said reference period.

4. A digital image forming apparatus as claimed in claim 1, wherein said abnormality specifying means produces abnormality specifying information indicating that there is abnormality other than a rotation speed of said deflection means when said light sensing means does not sense said laser beam during an operation of continuously turning on said laser beam source by said continuous turning-on means.

* * * * *